United States Patent
Oh et al.

(10) Patent No.: US 10,922,209 B2
(45) Date of Patent: Feb. 16, 2021

(54) DEVICE AND METHOD FOR AUTOMATICALLY REPAIRING MEMORY DEALLOCATION ERRORS

(71) Applicant: KOREA UNIVERSITY RESEARCH AND BUSINESS FOUNDATION, Seoul (KR)

(72) Inventors: Hakjoo Oh, Seoul (KR); Junhee Lee, Seoul (KR); Seongjoon Hong, Seoul (KR)

(73) Assignee: KOREA UNIVERSITY RESEARCH AND BUSINESS FOUNDATION, Seoul (KR)

(*) Notice: Subject to any disclaimer, the term of this patent is extended or adjusted under 35 U.S.C. 154(b) by 0 days.

(21) Appl. No.: 16/421,097

(22) Filed: May 23, 2019

(65) Prior Publication Data
US 2019/0361790 A1    Nov. 28, 2019

(30) Foreign Application Priority Data
May 25, 2018  (KR) .................. 10-2018-0059843

(51) Int. Cl.
| G06F 11/36 | (2006.01) |
| G06F 8/65  | (2018.01) |
| G06F 8/75  | (2018.01) |

(52) U.S. Cl.
CPC ........... *G06F 11/3612* (2013.01); *G06F 8/65* (2013.01); *G06F 8/75* (2013.01); *G06F 11/3604* (2013.01); *G06F 11/3608* (2013.01)

(58) Field of Classification Search
None
See application file for complete search history.

(56) References Cited

U.S. PATENT DOCUMENTS

| 5,590,329 A * | 12/1996 | Goodnow, II | ...... G06F 11/3624 |
|               |         |             | 714/E11.211 |
| 6,823,507 B1 * | 11/2004 | Srinivasan | .......... G06F 11/3604 |
|               |         |            | 714/E11.218 |

(Continued)

FOREIGN PATENT DOCUMENTS

| JP | 2003-535415 A | 11/2003 |
| KR | 10-0501936 B1 | 7/2005 |

(Continued)

OTHER PUBLICATIONS

Gao et al. "Safe Memory-Leak Fixing for C Programs", 2015, 2015 IEEE/ACM 37th IEE International Conference on Software Engineering (Year: 2015).*

(Continued)

*Primary Examiner* — Jason D Mitchell
(74) *Attorney, Agent, or Firm* — Hauptman Ham, LLP (57) ABSTRACT

A device for automatically repairing memory deallocation errors is disclosed. The device includes: a static analysis unit configured to generate status information for each one of the objects included in the source code of a program by way of a static analysis of the source code, where the status information includes position information, pointer information, and patch information, the position information associated with allocation sites of the objects, the pointer information associated with pointers pointing to the objects, the patch information associated with deallocation statements capable of deallocating the objects; a decision unit configured to choose patch candidates from the patch information and decide on a combination of the patch candidates capable of deallocating each of the objects only once; and a repair unit configured to repair the source code according to the combination of patch candidates.

10 Claims, 11 Drawing Sheets

(56) References Cited

U.S. PATENT DOCUMENTS

| | | | | |
|---|---|---|---|---|
| 9,864,649 B2* | 1/2018 | Gottschlich | ......... | G06F 11/3636 |
| 2008/0229286 A1* | 9/2008 | Kahlon | ............... | G06F 11/3604 |
| | | | | 717/126 |
| 2009/0193401 A1* | 7/2009 | Balakrishnan | ...... | G06F 11/3608 |
| | | | | 717/144 |
| 2010/0293530 A1* | 11/2010 | Ivancic | ............... | G06F 11/3608 |
| | | | | 717/126 |
| 2014/0237599 A1* | 8/2014 | Gertner | ............... | H04L 63/1441 |
| | | | | 726/24 |

FOREIGN PATENT DOCUMENTS

| | | |
|---|---|---|
| KR | 10-0965426 B1 | 6/2010 |
| KR | 10-1438924 B1 | 9/2014 |
| KR | 10-1754532 B1 | 7/2017 |

OTHER PUBLICATIONS

Heine et al. "A practialc flow-sensitive and context-sensitive C and C++ memory leak detector", 2003, Proceedings of the ACM SIGPLAN 2003 conference on Programming languaeg design and implementation. (Year: 2003).*

Clause et al. "Leakpoint: pinpointing the causes of memory leaks", 2010, 2010 ACM/IEEE 32nd International Conference on Software Engineering (Year: 2010).*

Qing Gao et al., Safe Memory-Leak Fixing for C Programs, Proceedings of the 37th International Conference on Software Engineering (ICSE '15), pp. 459-470, 2015, Florence, Italy.

Korean Office Action for corresponding Korean application No. 10-2018-0059843 dated Sep. 19, 2019.

* cited by examiner

FIG. 1A

```
1   in = malloc(1);
2   out = malloc(1);
3   ... // use in, out
4   free(out);
5   free(in);
6
7   in = malloc(2);
8   if (in == NULL) {
9
10    goto err;
11  }
12
13  out = malloc(2);
14  if (out == NULL) {
15    free(in);
16
17    goto err;
18  }
19  ... // use in, out
20  err:
21    free(in);
22    free(out);
23    return;
```

Original code
(double-free)

FIG. 1B

```
1   in = malloc(1);
2   out = malloc(1);
3   ...
4   free(out);
5   free(in);
6
7   in = malloc(2);
8   if (in == NULL) {
9     out = NULL; // +
10    goto err;
11  }
12
13  out = malloc(2);
14  if (out == NULL) {
15    free(in);
16    in = NULL; // +
17    goto err;
18  }
19  ...
20  err:
21    free(in);
22    free(out);
23    return;
```

First patch (2007.9)
(correct)

FIG. 1C

```
1   in = malloc(1);
2   out = malloc(1);
3   ...
4   // -
5   free(in);
6
7   in = malloc(2);
8   if (in == NULL) {
9      out = NULL;
10     goto err;
11  }
12  free(out); // +
13  out = malloc(2);
14  if (out == NULL) {
15     free(in);
16     in = NULL;
17     goto err;
18  }
19  ...
20  err:
21     free(in);
22     free(out);
23     return;
```

Second patch (2008.6)
(memory-leak)

FIG. 1D

```
1   in = malloc(1);
2   out = malloc(1);
3   ...
4   free(out); // +
5   free(in);
6   out = NULL; // +
7   in = malloc(2);
8   if (in == NULL) {
9      out = NULL;
10     goto err;
11  }
12  // -
13  out = malloc(2);
14  if (out == NULL) {
15     free(in);
16     in = NULL;
17     goto err;
18  }
19  ...
20  err:
21     free(in);
22     free(out);
23     return;
```

Third patch (2008.7)
(correct)

|        | $T_1$ | $T_2$ | $T_3$ |
|--------|-------|-------|-------|
| (3, p) | 0     | 1     | 0     |
| (8, p) | 0     | 1     | 1     |
| (8, q) | 1     | 0     | 1     |

FIG. 6A

```
1   p = malloc(1); // o1
2   if (...) {
3       q = malloc(1); // o2
4
5   }
6   else
7       q = p;
8       ... = *q; // use q
9       free(q);
10      free(p);
```

```
1   p = malloc(1);
2   if (...) {
3      q = malloc(1);
4      free(p); // +
5   }
6   else
7      q = p;
8      ... = *q;
9   free(q);
10  // -
```

FIG. 7A

| CWE-ID | Functional Variants | Bugs | Ours | LeakFix |
|---|---|---|---|---|
| 401 | int_malloc | 38 | 38 | 29 |
|  | struct_malloc | 38 | 38 | 29 |
| 415 | free_int | 38 | 38 | 20 |
|  | free_struct | 38 | 38 | 19 |
| 416 | malloc_free_int | 20 | 20 | 20 |
|  | malloc_free_struct | 20 | 20 | 20 |
|  | return_freed_ptr | 18 | 18 | 0 |
| Total |  | 210 | 210 | 137 |

FIG. 7B

| Programs | LoC | #Al. | Ours | | LeakFix | |
|---|---|---|---|---|---|---|
| | | | Fix/Ins. | Time | Fix/Ins. | Time |
| yes | 857 | 1 | 1 | < 1.0 | ✗ | < 1.0 |
| users | 886 | 1 | 1 | < 1.0 | ✗ | < 1.0 |
| unexpand | 1,109 | 1 | 1 | < 1.0 | ✗ | < 1.0 |
| tee | 1,206 | 1 | 1 | 1.3 | 1 | < 1.0 |
| mktemp | 1,236 | 4 | ✗ | 1.6 | ✗ | < 1.0 |
| tsort | 1,444 | 3 | - | ⊥ | ✗ | < 1.0 |
| paste | 1,540 | 3 | 1 | 5.9 | △/3 | < 1.0 |
| date | 1,619 | 1 | 1 | 4.3 | ✗ | < 1.0 |
| nl | 1,658 | 4 | 5 | 72.4 | ✗ | < 1.0 |
| cut | 1,662 | 1 | ✗ | 39.9 | ✗ | < 1.0 |
| pinky | 1,740 | 3 | 4 | 27.6 | ✗ | < 1.0 |
| cat | 1,891 | 3 | ✗ | 18.7 | ✗ | < 1.0 |
| ln | 1,948 | 2 | ✗ | 16.2 | ✗ | < 1.0 |
| printf | 2,020 | 1 | 1 | 4.4 | ✗ | < 1.0 |
| stdbuf | 2,150 | 3 | 3 | 2.5 | ✗ | < 1.0 |
| wc | 2,600 | 1 | 1 | 49.2 | △/2 | < 1.0 |
| shred | 2,836 | 5 | ✗ | 161.4 | ✗ | < 1.0 |
| cp | 2,983 | 8 | - | ⊥ | ✗ | < 1.0 |
| who | 2,990 | 8 | - | ⊥ | ✗ | < 1.0 |
| install | 3,197 | 1 | - | ⊥ | ✗ | < 1.0 |
| tr | 3,605 | 9 | - | ⊥ | ✗ | < 1.0 |
| expr | 3,722 | 9 | - | ⊥ | ✗ | < 1.0 |
| stat | 3,754 | 6 | 3 | 71.4 | ✗ | < 1.0 |
| dd | 5,323 | 2 | - | ⊥ | ✗ | < 1.0 |

DEVICE AND METHOD FOR AUTOMATICALLY REPAIRING MEMORY DEALLOCATION ERRORS

CROSS-REFERENCE TO RELATED APPLICATIONS

This application claims the benefit of Korean Patent Application No. 10-2018-0059843, filed with the Korean Intellectual Property Office on May 25, 2018, the disclosure of which is incorporated herein by reference in its entirety.

BACKGROUND

1. Technical Field

The present invention relates to a device and method for automatically repairing a program, more particularly to a device and method for automatically repairing memory deallocation errors.

2. Description of the Related Art

When a dynamically allocated object is not properly deallocated in a programming language such as C/C++, a memory deallocation error may occur. To repair this error, it may be necessary to manually identify and deallocate all objects that are not being used. However, manually repairing a memory deallocation error requires a considerable amount of time, and moreover, additional errors may be incurred by the manual repair.

Automatic program repair is a technology for automatically fixing errors in a program. Typical automatic program repair techniques operate based on input/output examples. More specifically, input/output examples that result in errors may first be considered to find the causes of the errors, and the program may be repaired to satisfy proper input/output examples. However, such techniques may not be suitable for fixing errors such as memory deallocation errors, which are difficult to represent as input/output examples.

Addressing this problem, Qing Gao et al. proposed a technique of fixing a memory leak by inserting a deallocation statement (free), for an object that is definitely a memory leak in a program (Qing Gao, Yingfei Xiong, Yaqing Mi, Lu Zhang, Weikun Yang, Zhaoping Zhou, Bing Xie, and Hong Mei. 2015; Safe Memory-leak Fixing for C Programs, Proceedings of the 37th International Conference on Software Engineering (ICSE '15). pp. 459-470). However, this technique does not guarantee that the repaired program does not contain a memory leak and also is unable to fix other memory deallocation errors.

SUMMARY OF THE INVENTION

Certain objectives of the invention include enabling an automatic check of the source code, guaranteeing an absence of memory deallocation errors by repairing memory deallocation errors, and drastically reducing the time spent in checking the source code.

A device for automatically repairing memory deallocation errors according to an embodiment of the invention can include: a static analysis unit configured to generate status information for each one of the objects included in the source code of a program by way of a static analysis of the source code, where the status information can include position information, pointer information, and patch information, the position information associated with allocation sites of the objects, the pointer information associated with pointers pointing to the objects, the patch information associated with deallocation statements capable of deallocating the objects; a decision unit configured to choose patch candidates from the patch information and decide on a combination of the patch candidates capable of deallocating each of the objects only once; and a repair unit configured to repair the source code according to the combination of patch candidates.

A method for automatically repairing memory deallocation errors according to an embodiment of the invention can include: generating status information for each one of the objects included in the source code of a program by way of a static analysis of the source code, where the status information can include position information, pointer information, and patch information, the position information associated with allocation sites of the objects, the pointer information associated with pointers pointing to the objects, the patch information associated with deallocation statements capable of deallocating the objects; choosing patch candidates from the patch information and deciding on a combination of the patch candidates capable of deallocating each of the objects only once; and repairing the source code according to the combination of patch candidates.

An embodiment of the invention can ensure that a code does not include memory deallocation errors by checking the code automatically and making repairs such that the code is free of memory deallocation errors.

Moreover, the time for checking the code can be drastically reduced.

Additional aspects and advantages of the present invention will be set forth in part in the description which follows, and in part will be obvious from the description, or may be learned by practice of the invention.

DETAILED DESCRIPTION OF THE INVENTION

Disclosed hereinafter are exemplary embodiments of the present invention. Particular structural or functional descriptions provided for the embodiments hereafter are intended merely to describe embodiments according to the concept of the present invention. The embodiments are not limited as to a particular embodiment.

Terms such as "first" and "second" may be used to describe various parts or elements, but the parts or elements should not be limited by the terms. The terms may be used to distinguish one element from another element. For instance, a first element may be designated as a second element, and vice versa, while not departing from the extent of rights according to the concepts of the present invention.

Unless otherwise clearly stated, when one element is described, for example, as being "connected" or "coupled" to another element, the elements should be construed as being directly or indirectly linked (i.e., there may be an intermediate element between the elements). Similar interpretation should apply to such relational terms as "between", "neighboring," and "adjacent to."

Terms used herein are used to describe a particular exemplary embodiment and should not be intended to limit the present invention. Unless otherwise clearly stated, a singular term denotes and includes a plurality. Terms such as "including" and "having" also should not limit the present invention to the features, numbers, steps, operations, sub-parts and elements, and combinations thereof, as described; others may exist, be added or modified. Existence and addition as to one or more of features, numbers, steps, etc. should not be precluded.

Unless otherwise clearly stated, all of the terms used herein, including scientific or technical terms, have meanings which are ordinarily understood by a person skilled in the art. Terms, which are found and defined in an ordinary dictionary, should be interpreted in accordance with their usage in the art. Unless otherwise clearly defined herein, the terms are not interpreted in an ideal or overly formal manner.

Hereinafter, exemplary embodiments of the present invention are described in detail with reference to the accompanying drawings.

A memory deallocation error is an error that occurs when the developer does not properly deallocate memory after directly allocating memory in a programming language such as C/C++. Examples may include: (i) memory-leak errors, which occur when allocated memory is not properly deallocated, (ii) double-free errors, which occur when deallocating memory that has already been deallocated, and (iii) use-after-free errors, which occur when memory is deallocated too early so that the memory is used again after it has been deallocated.

FIGS. 1A to 1D illustrate an example of a buggy code and examples of repaired code having the bug repaired.

Referring to FIGS. 1A to 1D, an original code corresponding to a buddy code contains two double-free errors. In line 7 of the original code, as 'malloc' fails (i.e. the buffer is not reallocated) and 'NULL' is returned, 'free' which was already deallocated in line 4 is called again. Similarly, as 'malloc' fails in line 13 of the original code, 'in' is deallocated twice by 'free' in line 15 and line 21.

Figure 1A:
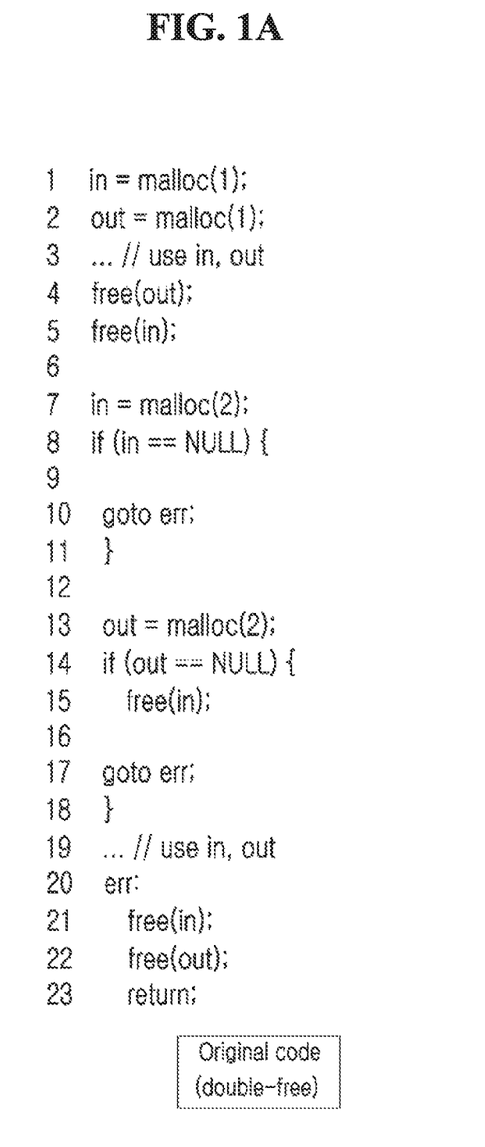
FIGS. 1A to 1D illustrate an example of a buggy code and examples of repaired code having the bug repaired.
Figure 1B:
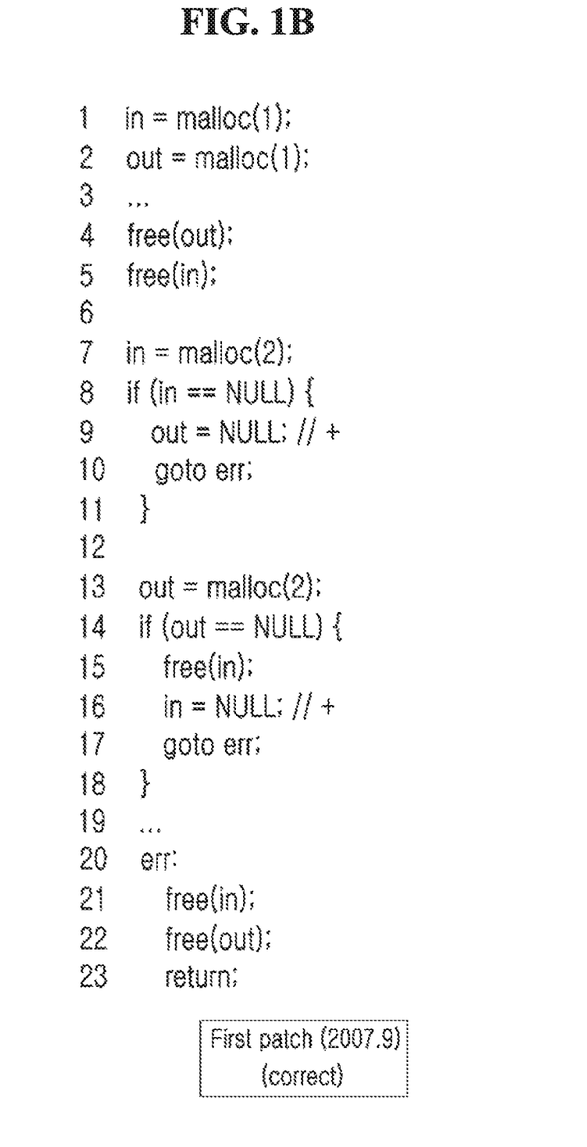

In response, a first patch, which corresponds to a repaired version of the original code, resolves the problem by nullifying the buffer in line 9 and line 16. However, since the code for nullifying 'in' is inserted with the error path having the repeated 'free(in)' still remaining, it has become difficult to correctly understand the program.

Figure 1C:
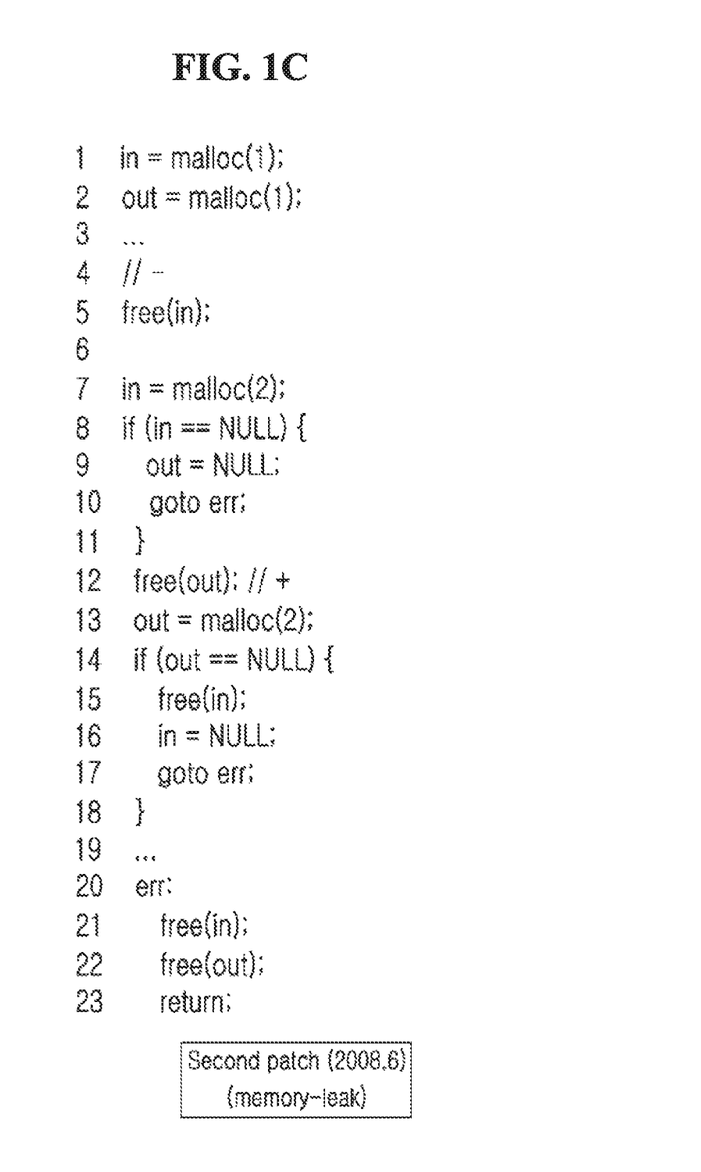

In a second patch, corresponding to a repaired version of the first patch, the developer determined that there is a memory leak error, even though the first patch does not contain an error, and has moved 'free(out)' from line 4 to line 12. However, if 'in' fails reallocation in the second patch, 'out' would be nullified, whereby the object pointed to by the 'out' pointer can no longer be reached, and a memory leak error would occur.

Figure 1D:
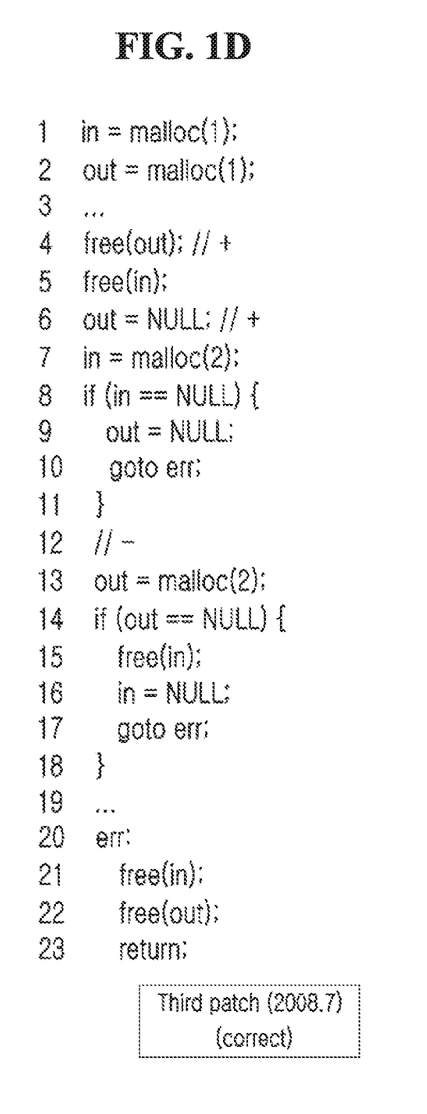

An third patch, corresponding to a repaired version of the second patch, has 'free(out)' of the second patch moved back to its original position, and in order to avoid a double-free error, 'out' has been made 'NULL' in line 6. However, this code has become much more complicated and confusing compared to the first patch.

As considered above, the process for fixing memory deallocation errors in a buggy code may cause other memory deallocation errors to occur or may cause the source code to become more complicated. As a solution, a device and method for automatically repairing memory deallocation errors according to an embodiment of the invention aim to resolve this problem by deallocating the buffer immediately before it is reallocated.

Figure 2:
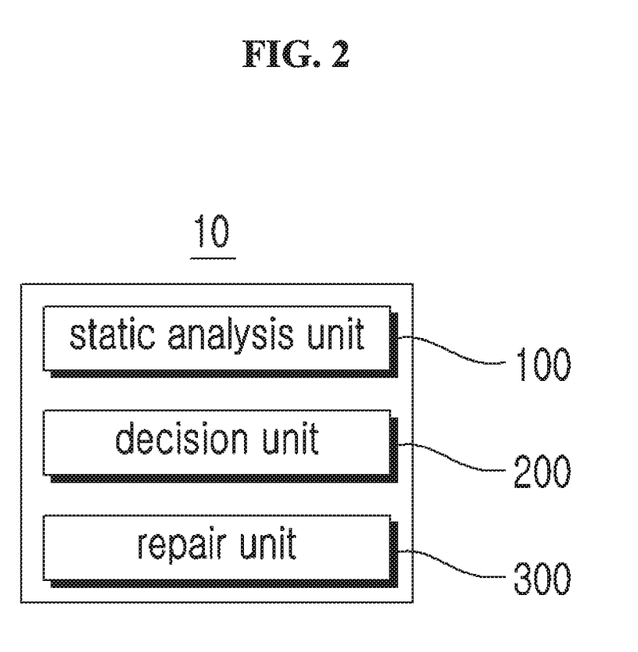
FIG. 2 is a block diagram of a device for automatically repairing memory deallocation errors according to an embodiment of the invention.

FIG. 2 is a block diagram of a device for automatically repairing memory deallocation errors according to an embodiment of the invention. Referring to FIG. 2, a device 10 for automatically repairing memory deallocation errors according to an embodiment of the invention may include a static analysis unit 100, a decision unit 200, and a repair unit 300.

The static analysis unit 100 may generate status information for each of the objects included in a source code of an inputted program through a static analysis of the source code.

The status information can have a tuple form, for example, and can be represented as follows.

⟨o, may, must, mustNot, patch, patchNot⟩

In the status information, o represents information on the allocation sites of the objects, (may, must, mustNot) represent pointer information concerning pointers pointing to the objects, and (patch, patchNot) represent patch information concerning information on deallocation statements capable of deallocating the objects for each point of the source code.

In an embodiment of the invention, 'may' included in the pointer information may be a set of pointers that possibly may point to one of the objects. 'must' may be a set of pointers that definitely point to the one object. 'mustNot' may be a set of pointers that do not point to the one object. In other words, the pointer information may represent sets of paths that may point to, do point to, or do not point to the one object.

For a more detailed description of 'may', for any one of the objects, 'may' can be a set of pointers obtained by over-approximating all pointers that may possibly point to the one object and can include 'must' but excludes 'mustNot'.

The static analysis unit 100 can generate the pointer information described above by way of point-to analysis. Point-to analysis is an access path based analysis method which provides an approximation by accurately analyzing only those paths having a particular length and ignoring all other complicated paths. Point-to analysis considers the relationships of all pointer variables to analyze whether or not pointer variables can point to the same object.

Analysis methods well known to the skilled person, such as the Andersen analysis, the Steensgard analysis, etc., for example, can be employed for the point-to analysis.

The patch information may include information regarding deallocation statements capable of deallocating each object, where the deallocation statements capable of deallocation can be represented as {(c, p)}, for example, with a particular point (c) of the source code and a pointer formula (p). Here, {(c, p)} represents a deallocation statement 'free(p)' inserted after a particular point (c) of the source code.

In an embodiment of the invention, 'patch' included in the patch information may be information concerning deallocation statements which guarantee that the objects can be safely deallocated, i.e. without memory deallocation errors. 'patchNot' may be information concerning deallocation statements which do not guarantee that the objects can be allocated without error.

The static analysis unit 100 may update the 'patch' and 'patchNot' included in the patch information to 'patch'' and 'patchNot'' at each point of the source code. The process by which the static analysis unit 100 updates the patch information will be described later on in further detail.

If the source code contains a branch, the static analysis unit 100 can generate the status information for each of the objects along the execution paths of the branch. For example, when generating status information for an object, the status information can be generated for the object both along the 'true' path and along the 'false' path according to the execution paths of the branch.

The decision unit 200 may choose patch candidates from the patch information included in the status information generated by the static analysis unit 100 and may decide on a combination of the patch candidates with which each of the objects can be deallocated once only.

The patch information from which the patch candidates are chosen may be (patch', patchNot'), which is the patch information with updates completed by the static analysis unit 100 for all points of the source code. Here, 'patch'' may be patches that have been updated for each point and may be patches that are capable of safely deallocating the objects, and 'patchNot'' may be patches that have been updated for each point and may be patches that are not capable of safely deallocating the objects. Accordingly, the decision unit 200 can choose the patch candidates by excluding the unsafe patch information, 'patchNot'', from the safe patch information, 'patch''.

By patching the source code with the patch candidates chosen by the decision unit 200 as described above, it is possible to safely deallocate the allocated objects without use-after-free errors. However, if the source code is patched with all of the patch candidates, there is a possibility of double-free errors occurring. As such, a combination of deallocation statements that can deallocate each object once without repeatedly deallocating the allocated objects has to be found from the patch candidates.

A decision unit 200 according to an embodiment of the invention can find an optimal patch candidate combination by converting the problem of finding the optimal patch candidates into an exact cover problem and solving the exact cover problem. An exact cover problem is an NP-complete problem, and the decision unit 200 can use various SAT solvers to solve the problem and find the optimal combination.

A SAT solver is an algorithm for finding the solution to a SAT (satisfiability) problem, which is a problem for determining whether or not an equation formulated in a Boolean form has a solution. Examples of a SAT solver can include, for example, the Chaff algorithm, the DPLL algorithm, the GRASP algorithm, the Satz, etc.

The repair unit 300 may repair the source code according to the combination of patch candidates decided on by the decision unit 200. According to the combination of patch candidates, the repair unit 300 may delete all of the deallocation statements of the source code and may repair the source code by inserting the deallocation statements of the patch candidates at each point, and as the source code repaired in this manner has the allocated objects deallocated once only without error, it can be guaranteed that no memory deallocation errors are present.

Figure 3:
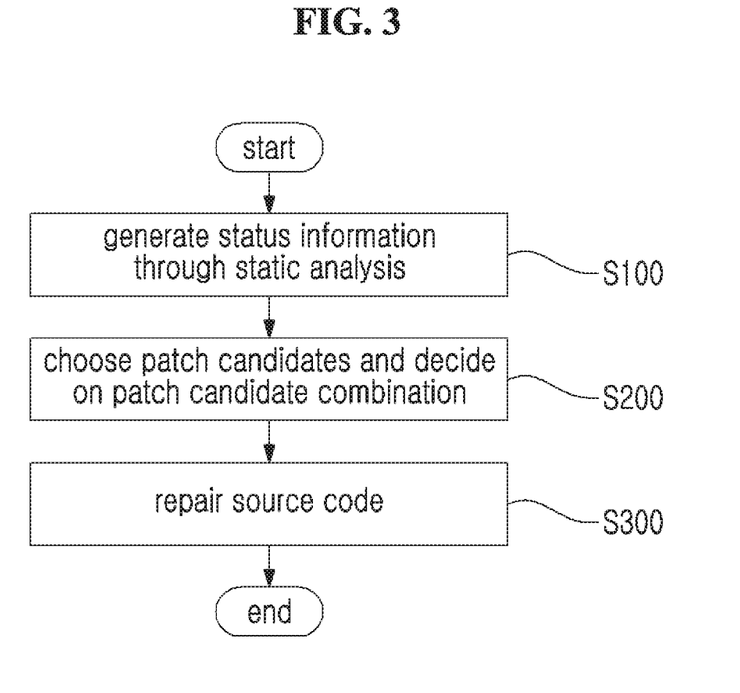
FIG. 3 is a flowchart of a method for automatically repairing memory deallocation errors according to an embodiment of the invention.

FIG. 3 is a flowchart of a method for automatically repairing memory deallocation errors according to an embodiment of the invention.

Referring to FIG. 3, a method for automatically repairing memory deallocation errors according to an embodiment of the invention may include generating status information for all allocated objects through a static analysis of the source code (operation S100), choosing patch candidates from the status information and deciding on a combination of patch candidates that can deallocate all of the objects once each (operation S200) by solving an exact cover problem, and repairing the source code according to the decided combination of patch candidates (operation S300), so that the source code does not include any memory deallocation errors. A more detailed description of operation S100 and operation S200 is provided below.

Static Analysis

Figure 4:
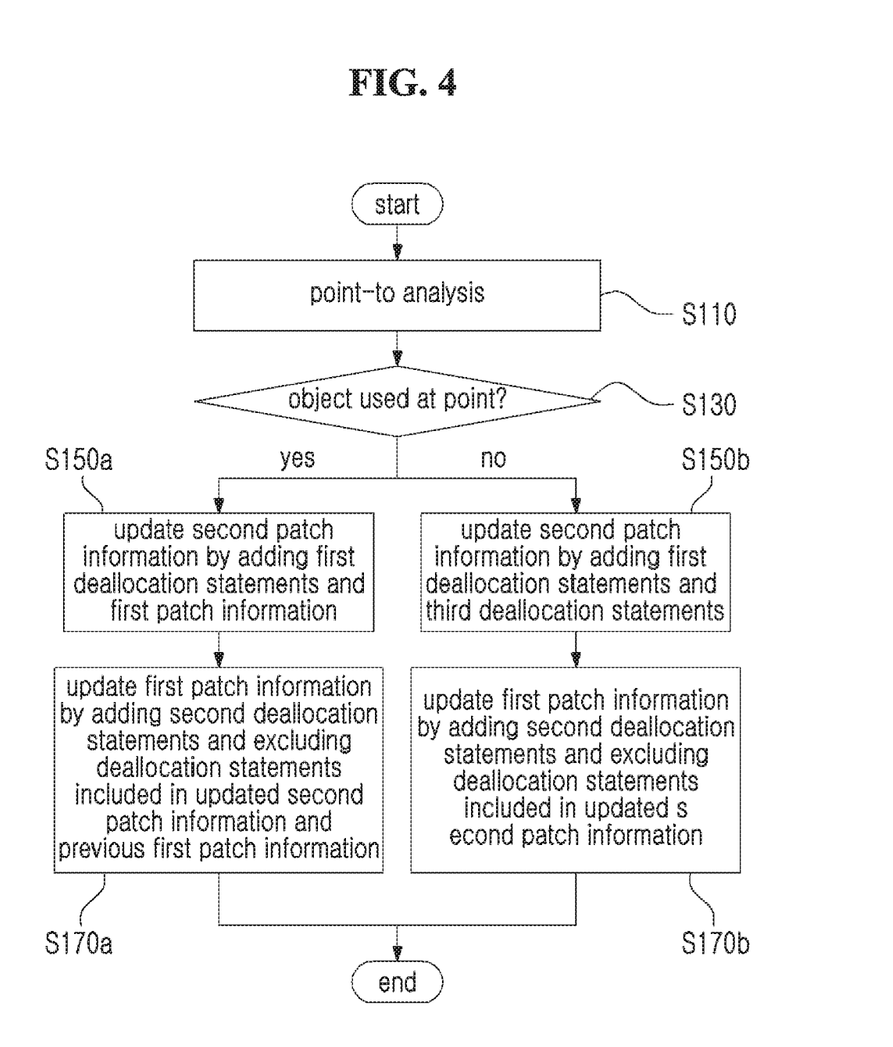
FIG. 4 is a flowchart for a method of static analysis according to an embodiment of the invention.

FIG. 4 is a flowchart for a method of static analysis according to an embodiment of the invention.

Referring to FIG. 4, operation S100 of performing a static analysis may include performing a point-to analysis (operation S110) and updating the patch information (operations S130 to S170a and S170b).

In operation S110, a point-to analysis can be performed to generate status information at each point (c) of the source code as below.

⟨o, may', must', mustNot', patch, patchNot⟩

Here, 'may'' can be a set of pointers that may possibly point to the one object and can be updated from the 'may' included in the status information for the point before the particular point (c) of the source code for which the status information is being generated. 'must'' can be a set of pointers that definitely point to the one object and can be updated from the 'must' included in the status information for the point before the particular point (c) of the source code for which the status information is being generated. 'mustNot'' can be a set of pointers that do not point to the one object and can be updated from the 'mustNot' included in the status information for the point before the particular point (c) of the source code for which the status information is being generated.

In operations S130 to S170a and S170b, the patch information may be updated by using the status information generated by way of the point-to analysis. In operations S130 to S170a and S170b, the patch information may be updated to exclude: (i) deallocation statements that deallocate objects but are liable to cause use-after-free errors, (ii) deallocation statements that deallocate objects but are liable to cause double-free errors, and (iii) deallocation statements that have not been verified as regards their ability to deallocate objects and thus entail uncertainty with respect to whether the objects can or cannot be deallocated, so that the following may be provided.

⟨o, may', must', mustNot', patch', patchNot'⟩

Here, 'patch'' can be information regarding deallocation statements that guarantee safe deallocation of the objects, i.e. without memory deallocation errors, and can be updated from the 'patch' included in the status information for the point before the particular point (c) of the source code for which the status information is being generated. 'patchNot'' can be information regarding deallocation statements that do not guarantee deallocation of the objects without errors and can be updated from the 'patchNot' included in the status information for the point before the particular point (c) of the source code for which the status information is being generated.

More specifically, 'patch'' and 'patchNot'' can be generated for a particular object (o), according to whether or not the particular object (o) can be used at each point (c) of the source code, as below.

$$\text{patch}' = \begin{cases} G \setminus patchNot' & o \text{ can be used at } c \\ (patch \cup G) \setminus patchNot' & o \text{ is not used at } c \end{cases}$$

$$\text{patchNot}' = \begin{cases} patchNot \cup U \cup patch & o \text{ can be used at } c \\ patchNot \cup U \cup D & o \text{ is not used at } c \end{cases}$$

Here, G refers to deallocation statements capable of deallocating objects at point (c) and can be represented as below.

$$G=\{(c,p)|p\in\text{must'}\}$$

That is, G refers to deallocation statements for pointers (p) belonging to 'must'', which may be a set of pointers that definitely point to objects, at each point (c).

D refers to deallocation statements that repeatedly deallocate objects at each point (c) and can be represented as below.

$$D=\text{patch}\cap G$$

That is, D refers to deallocation statements that are included concurrently in both 'patch' and G.

U refers to deallocation statements with which deallocation of objects is uncertain and which therefore do not ensure stability and can be represented as below.

$$U=\{(c,p)|p\in\text{may'}\setminus\text{must'}\}$$

That is, U refers to deallocation statements for pointers (p) obtained by excluding the set 'must'', which may be the set of pointers that definitely point to objects, from the set 'may'', which may be the set of pointers that may possibly point to objects, at each point (c).

Operations S130 to S170a and S170b may generate 'patch'' and 'patchNot'' by using the deallocation statements (G, D, U) described above and the previous patch information (patch, patchNot).

To this end, in operation S130, it may be determined whether or not a particular object (o) can be used at each point (c).

If the result of the determining in operation S130 is that the object (o) can be used at point (c), then operation S150a may update 'patchNot', which is the previous patch information, to 'patchNot'' by adding information concerning 'patch' and U.

Next, in operation S170a, the previous patch information 'patch' may be updated to 'patch'' by excluding the deallocation statements included in 'patch' from 'patch', adding the information regarding G, and excluding the 'patchNot'' that has been updated in operation S150a. Here, the deallocation statements included in the previous 'patch' may be excluded, since these deallocation statements can cause use-after-free errors at point (c).

On the other hand, if the result of the determining in operation S130 is that the object (o) cannot be used at point (c), then operation S150b may update 'patchNot', which is the previous patch information, to 'patchNot'' by adding information regarding U and information regarding D to 'patchNot'.

Next, in operation S170b, the previous patch information 'patch' may be updated to 'patch'' by adding information regarding G and excluding the 'patchNot'' that has been updated in operation S150b from (patch u G).

Deciding on Patch Candidates

Figure 5:
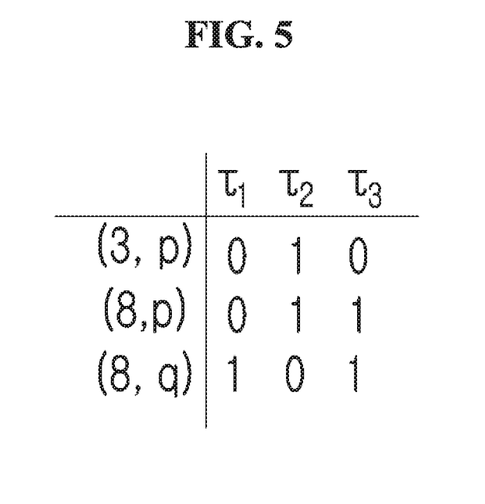
FIG. 5 illustrates an example of an exact cover problem.

FIG. 5 illustrates an example of an exact cover problem.

Referring to FIG. 5, in operation S200, the combination of patch candidates for deallocating all of the objects only once can be decided by solving an exact cover problem, which can be represented as the matrix shown in FIG. 5.

In the matrix of FIG. 5, each row represents an element of the chosen patch candidates, while each column represents status information for the objects. Here, if the value of an element included in the matrix is 1, this means that the patch candidate $\{(c, p)\}$ corresponding to the row where the value of the element is 1 is able to safely deallocate the object exhibiting the status information of the corresponding column, whereas if the value of the element is 0, this means that the patch candidate $\{(c, p)\}$ corresponding to the row where the value of the element is 0 is not able to safely deallocate the object exhibiting the status information of the corresponding column.

For example, in the matrix shown in FIG. 5, as the value of the element corresponding to the (1, 2) component is 1, the deallocation statement $\{(3, p)\}$ of the first row is capable of safely deallocating the object exhibiting the status information ($\tau_2$) of the second column.

However, considering the third row in the matrix of FIG. 5, since the values of the elements corresponding to the (2, 3) component and the (3, 3) component are both 1, the object exhibiting the status information ($\tau_3$) of the third column would be deallocated twice, and a double-free error would occur.

Thus, as the patch candidates that deallocate every object only once can be represented as a set of rows with which the value 1 occurs only once for each column in the matrix of FIG. 5, the patch candidates would be $\{(3, p), (8, q)\}$.

In solving the exact cover problem such as that described above, operation S200 can utilize various SAT solvers.

In the following, an example of a buggy code is used to illustrate a process by which a device 10 and method for automatically repairing memory deallocation errors according to an embodiment of the invention may generate and update status information for each point of the buggy code and ultimately find the patch candidates.

Figure 6A:
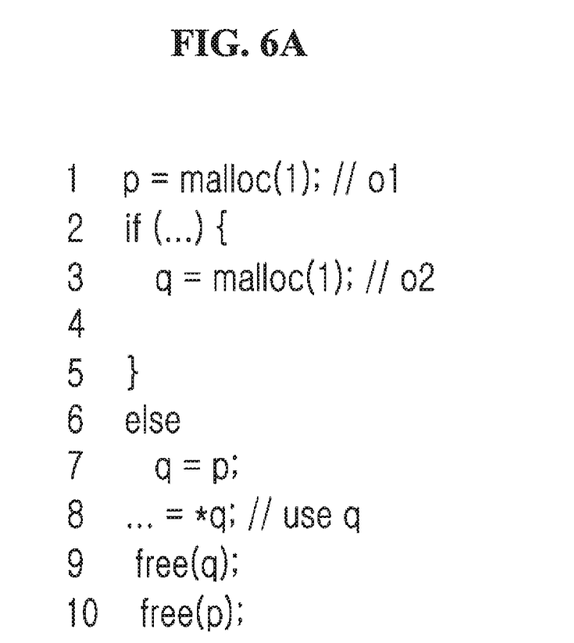
FIG. 6A illustrates an example of a buggy code.

FIG. 6A illustrates an example of a buggy code.

Referring to FIG. 6A, the buggy code of FIG. 6A includes a double-free error in the path 1->7->9->10. In line 1, the object is allocated, and pointer p points to the address where the object is allocated. In line 7, pointer q is made to point to the same object as pointer p. However, in lines 9 and 10, the object pointed to by pointers q and p is deallocated twice, resulting in a double-free error.

Figure 6B:
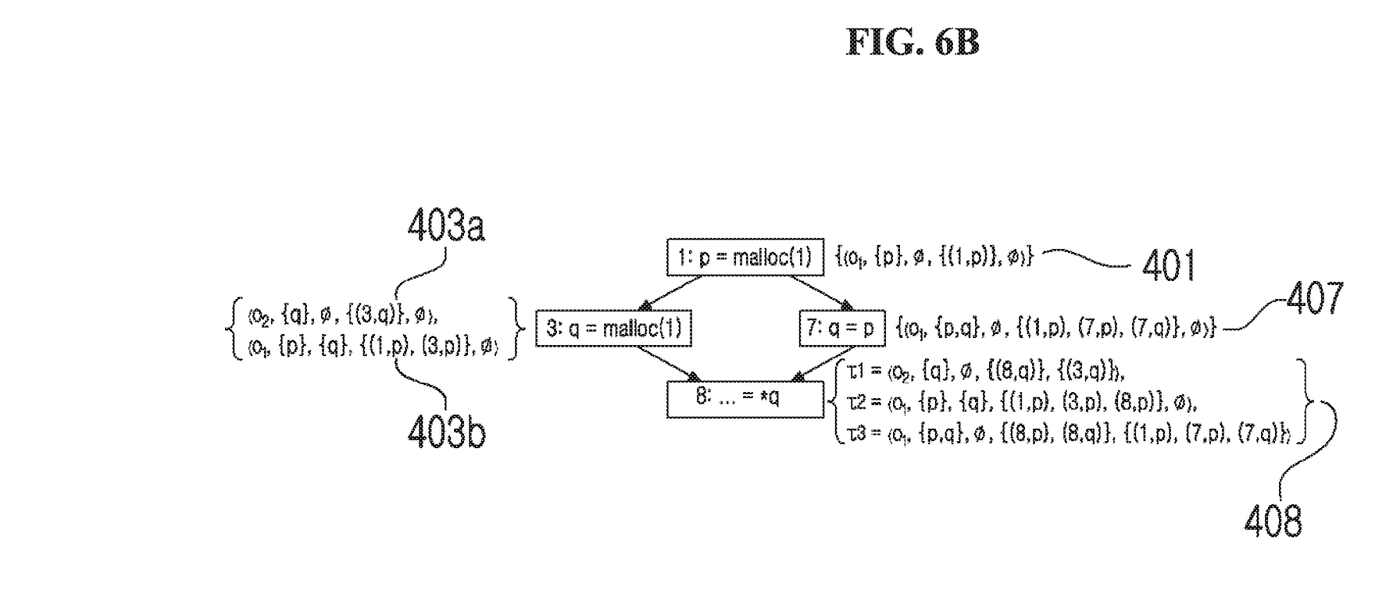
FIG. 6B illustrates an example of static analysis applied to the buggy code of FIG. 6A.

FIG. 6B illustrates an example of static analysis applied to the buggy code of FIG. 6A.

Referring to FIG. 6B, FIG. 6B shows a control-flow graph for the static analysis performed by a device 10 and method for automatically repairing memory deallocation errors according to an embodiment of the invention, together with the status information generated for each point. For convenience, the 'may' is omitted in the status information generated according to the static analysis illustrated in FIG. 6B.

At point 1, object o1 is allocated, and pointer p points to this object. That is, the pointer that definitely points to object o1 is $\{p\}$, and the deallocation statement capable of safely deallocating object o1 without error is the deallocation statement free(p) that immediately follows point 1.

Therefore, in the status information 401 generated at point 1, the 'patch' for the allocated object o1 is $\{(1, p)\}$, and since there is only a pointer that definitely points to object o1 at point 1, there are no 'mustNot' and no 'patchNot'.

Next, when following the 'true' path at the branch at point 2, at point 3, object o2 is newly allocated, and pointer q points to this object. Therefore, the pointer that definitely points to the corresponding object o2 is $\{q\}$, and the deallocation statement capable of safely deallocating object o2 without error is the deallocation statement free(q) that immediately follows point 3. Therefore, in the status information 403a generated at point 3, the 'patch' for the allocated object o2 is $\{(3, q)\}$.

Here, the status information 403b for object o1 is changed according to the allocation of object o2. As pointer q points to the newly allocated object o2, it can be seen that pointer q definitely does not point to object o1. Also, at point 3, it is still possible to safely deallocate object o1 by inserting free(p).

Therefore, the 'mustNot' included in the status information 403b for object o1 is updated to include $\{q\}$, while 'patch' is updated to $\{(1, p), (3, p)\}$.

When following the 'false' path at the branch at point 2, the copy command (q=p) at point 7 results in both pointer q and pointer p pointing to object o1, so that object o1 can be deallocated by a deallocation statement for not only pointer p but also pointer q. Therefore, in the status information 407 generated at point 7, the 'patch' for object o1 becomes $\{(1, p), (7, p), (7, q)\}$.

Immediately before point 8, which is where the branches meet again, the object statuses 403a, 403b, 407 for the respective branches by way of static analysis are combined to generate status information as shown below.

$$\left\{ \begin{array}{l} \langle o_2, \{q\}, \emptyset, \{(3, q)\}, \emptyset \rangle, \\ \langle o_1, \{p\}, \{q\}, \{(1, p), (3, p)\}, \emptyset \rangle, \\ \langle o_1, \{p, q\}, \emptyset, \{(1, p), (7, p), (7, q)\}, \emptyset \rangle \end{array} \right\}$$

The status information above represents the statuses of the object for the 'true' path and 'false' path of the branches in said order. The above status information generated immediately before point 8 is updated according to the status change at point 8.

At point 8, since pointer q is used (=*q), deallocation statements included in the previous 'patch' for all objects accessible with 'q' can cause a use-after-free error. As such, the deallocation statements included in the previous 'patch' are removed from 'patch' and added to 'patchNot'.

Referring to the status information 408 generated at point 8, in $\tau_1$ which represents the status information for object o2 along the 'true' path of the branch, $\{(3, q)\}$ included in the previous 'patch' would cause a use-after-free error. As such, this is removed from 'patch' and updated in 'patchNot', and $\{(8, q)\}$ which can safely deallocate object o2 at point 8 is updated in 'patch'.

As for $\tau_2$ which represents the status information for object of along the 'true' path of the branch, pointer q does not definitely point to the object, and as such, the previous 'patch' is not removed but $\{(8, p)\}$ is updated.

Figure 6C:
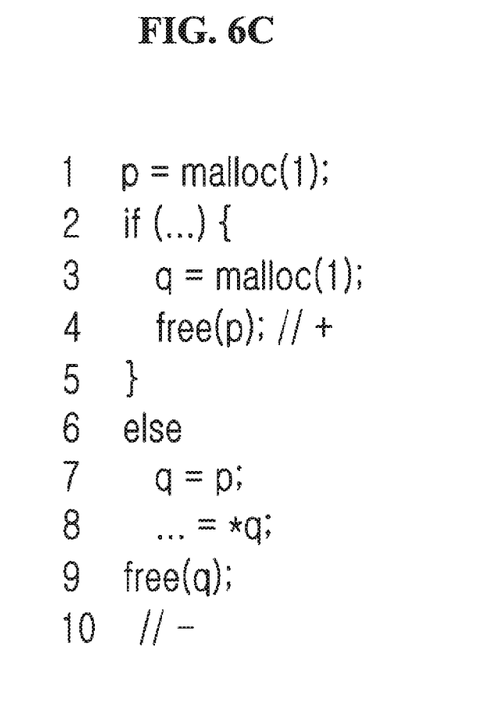
FIG. 6C illustrates a repaired code obtained after repairing the buggy code of FIG. 6A.

FIG. 6C illustrates a repaired code obtained after repairing the buggy code of FIG. 6A.

Referring to FIG. 6C, after the patch candidates are chosen by way of the static analysis of FIG. 6B, the optimal combination of patch candidates are decided on and the bugs in the code are repaired accordingly.

It can be seen that, according to the combination of patch candidates, the repaired code has the deallocation statement free(p) inserted at point 4, i.e. the point subsequent to point 3, and the deallocation statement free(q) inserted at point 9, i.e. the point subsequent to point 8, whereby the memory deallocation errors have been removed.

To evaluate the performance of an embodiment of the invention in repairing memory deallocation errors, the error repair performance is compared with that of LeakFix (Qing Gao, Yingfei Xiong, Yaqing Mi, Lu Zhang, Weikun Yang, Zhaoping Zhou, Bing Xie, and Hong Mei. 2015; Safe Memory-leak Fixing for C Programs, Proceedings of the 37th International Conference on Software Engineering (ICSE '15). pp. 459-470), which is another tool for repairing memory leak errors. For the performance evaluation, the benchmark programs Juliet Test Suite and GNU Coreutils are used.

As LeakFix is a program for repairing memory leak errors only, the performance comparison is conducted with all deallocation statements deleted from and memory leak errors inserted to the benchmark programs.

Figure 7A:
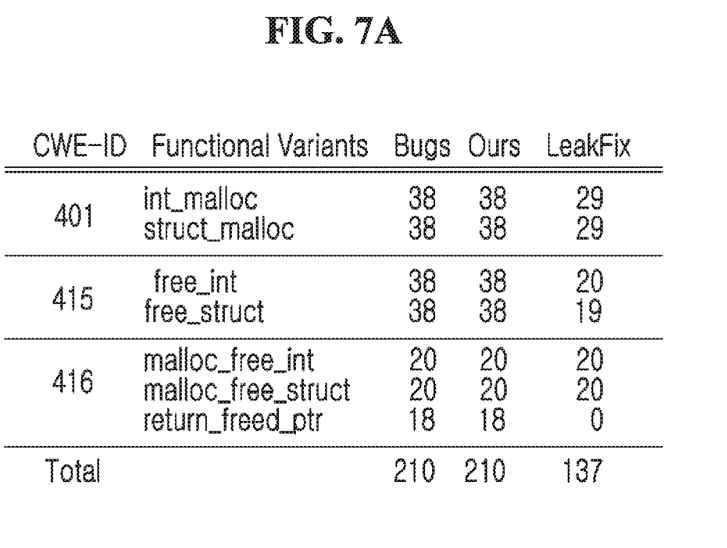
FIG. 7A shows a table evaluating the performance of an embodiment of the invention using an example of a benchmark program.

FIG. 7A shows a table evaluating the performance of an embodiment of the invention using an example of a benchmark program.

Referring to FIG. 7A, FIG. 7A shows the results of applying an embodiment of the invention and LeakFix to 210 test cases of the Juliet Test Suite, an example of a benchmark program. Comparing the results, it can be seen that whereas LeakFix provides successful patching in just 137 of the test cases, the embodiment of the invention provides successful patching in all of the test cases.

Figure 7B:
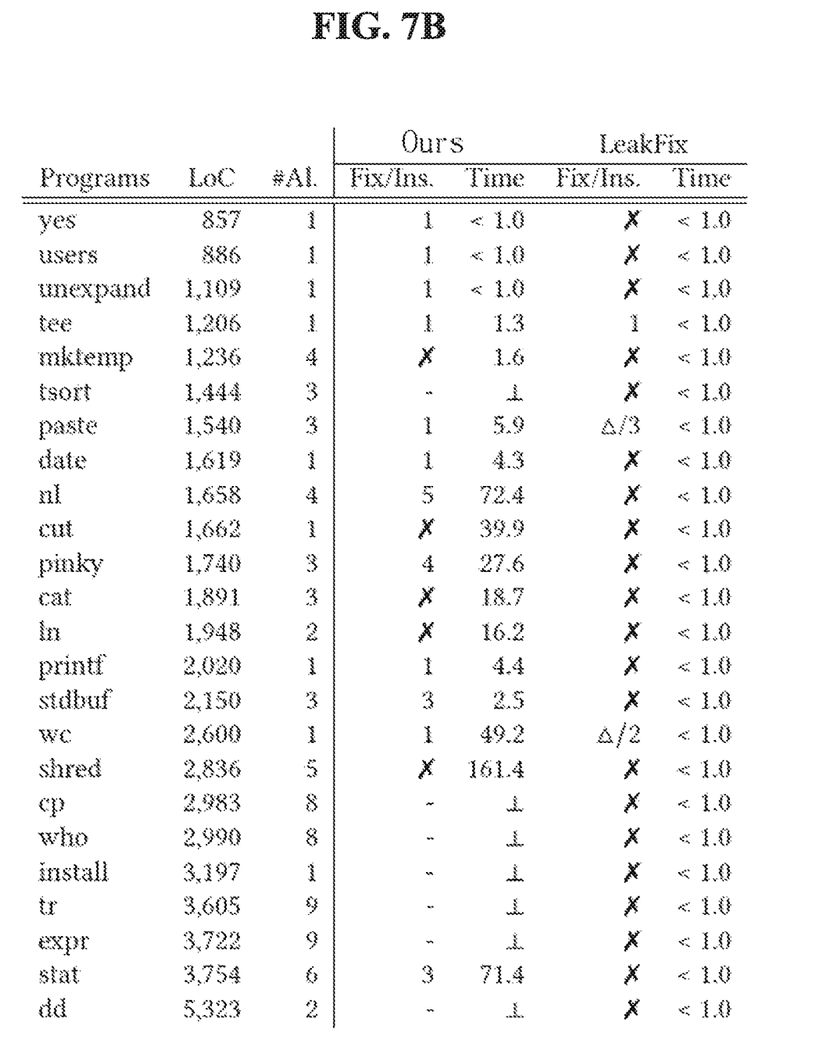
FIG. 7B shows a table evaluating the performance of an embodiment of the invention using another example of a benchmark program.

FIG. 7B shows a table evaluating the performance of an embodiment of the invention using another example of a benchmark program.

Referring to FIG. 7B, FIG. 7B shows the results of applying an embodiment of the invention and LeakFix to 24 programs of GPU Coreutils, another example of a benchmark program. Here, #Al. refers to the number of allocated areas in the program, and #Ins. refers to the number of deallocation statements inserted by each tool when the recovery process has succeeded. A program can be considered to have been properly repaired if all target allocation areas have been adequately deallocated with patches.

Comparing the results, it can be seen that whereas LeakFix provides successful patching in just 3 of the 24 programs, the embodiment of the invention provides successful automatic patching in 12 of the 24 programs.

As considered above, an embodiment of the invention can find patch candidates that are capable of properly repairing memory deallocation errors by solving an exact cover problem for status information of objects generated by static analysis. Compared with existing tools for handling memory deallocation errors, an embodiment of the invention can ensure that there are no memory deallocation errors and can also provide higher performance in error repair.

The device described above can be implemented as hardware elements, software elements, and/or a combination of hardware elements and software elements. For example, the device and elements described with reference to the embodiments above can be implemented by using one or more general-purpose computer or designated computer, examples of which include a processor, a controller, an ALU (arithmetic logic unit), a digital signal processor, a microcomputer, an FPGA (field programmable gate array), a PLU (programmable logic unit), a microprocessor, and any other device capable of executing and responding to instructions. A processing device can be used to execute an operating system (OS) and one or more software applications that operate on said operating system. Also, the processing device can access, store, manipulate, process, and generate data in response to an execution of software. Although there are instances in which the description refers to a single processing device for the sake of easier understanding, it should be obvious to the person having ordinary skill in the relevant field of art that the processing device can include a multiple number of processing elements and/or multiple types of processing elements. In certain examples, a processing device can include a multiple number of processors or a single processor and a controller. Other processing configurations are also possible, such as parallel processors and the like.

The software can include a computer program, code, instructions, or a combination of one or more of the above and can configure a processing device or instruct a processing device in an independent or collective manner. The software and/or data can be tangibly embodied permanently or temporarily as a certain type of machine, component, physical equipment, virtual equipment, computer storage medium or device, or a transmitted signal wave, to be interpreted by a processing device or to provide instructions or data to a processing device. The software can be distributed over a computer system that is connected via a network, to be stored or executed in a distributed manner. The software and data can be stored in one or more computer-readable recorded medium.

A method according to an embodiment of the invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc., specially designed to store and execute program instructions. Examples of the program instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

While the present invention is described above referencing a limited number of embodiments and drawings, those having ordinary skill in the relevant field of art would understand that various modifications and alterations can be derived from the descriptions set forth above. For example, similarly adequate results can be achieved even if the techniques described above are performed in an order different from that disclosed, and/or if the elements of the system, structure, device, circuit, etc., are coupled or combined in a form different from that disclosed or are replaced or substituted by other elements or equivalents.

Therefore, various other implementations, various other embodiments, and equivalents of the invention disclosed in the claims are encompassed by the scope of claims set forth below.

What is claimed is:

1. A device for automatically repairing memory deallocation errors, the device comprising:
    a static analysis unit configured to generate status information for each one of objects included in a source code of a program by way of a static analysis of the source code, the status information comprising position information, pointer information, and patch information, the position information associated with allocation sites of the objects, the pointer information associated with pointers pointing to the objects, the patch information associated with deallocation statements capable of deallocating the objects for each point of the source code;
    a decision unit configured to choose patch candidates from the patch information and decide on a combination of the patch candidates capable of deallocating each of the objects only once; and
    a repair unit configured to repair the source code according to the combination of patch candidates,
    wherein
    the static analysis unit generates the pointer information by way of point-to analysis, and
    the pointer information comprises first pointer information, second pointer information, and third pointer information, and
    the first pointer information is associated with information on pointers obtained by over-approximating all pointers possibly pointing to the one object, the second pointer information is associated with information on pointers pointing to the one object, and the third pointer information is associated with pointers not pointing to the one object.

2. The device for automatically repairing memory deallocation errors according to claim 1, wherein the patch information comprises first patch information and second patch information, the first patch information associated with information on deallocation statements guaranteed to be capable of deallocating the objects without errors, and the second patch information associated with information on deallocation statements not guaranteed to be capable of deallocating the objects without errors.

3. The device for automatically repairing memory deallocation errors according to claim 2, wherein for each point of the source code, the static analysis unit:
    updates the second patch information with the first patch information and information regarding first deallocation statements (U) if the objects are usable at said each point, the first deallocation statements (U) including deallocation statements for pointer information obtained by excluding the second pointer information from the first pointer information, and
    updates the second patch information with the information regarding first deallocation statements (U) and information regarding third deallocation statements (D) if the objects are not usable at said each point, the information regarding third deallocation statements (D) including information regarding deallocation statements included concurrently in both information regarding second deallocation statements (G) and the second patch information, the second deallocation statements (G) including deallocation statements for the second pointer information.

4. The device for automatically repairing memory deallocation errors according to claim 3, wherein for each point of the source code, the static analysis unit:
  updates the first patch information by excluding deallocation statements included in the first patch information from the first patch information, adding the information regarding second deallocation statements (G), and excluding deallocation statements included in the updated second patch information, if the objects are usable at said each point, and
  updates the first patch information by adding the information regarding second deallocation statements (G) to the first patch information and excluding the deallocation statements included in the updated second patch information, if the objects are not usable at said each point.

5. The device for automatically repairing memory deallocation errors according to claim 1, wherein the source code includes a branch, and the static analysis unit generates the status information for each of the objects along an execution path of the branch.

6. The device for automatically repairing memory deallocation errors according to claim 1, wherein the decision unit decides on the combination of patch candidates by using a SAT (satisfiability) solver.

7. A method for automatically repairing memory deallocation errors, the method comprising:
  generating status information for each one of objects included in a source code of a program by way of a static analysis of the source code, the status information comprising position information, pointer information, and patch information, the position information associated with allocation sites of the objects, the pointer information associated with pointers pointing to the objects, the patch information associated with deallocation statements capable of deallocating the objects for each point of the source code;
  choosing patch candidates from the patch information and deciding on a combination of the patch candidates capable of deallocating each of the objects only once; and
  repairing the source code according to the combination of patch candidates,
  wherein
    the generating of the status information further comprises generating the pointer information by way of point-to analysis,
    the pointer information comprises first pointer information, second pointer information, and third pointer information, and
    the first pointer information is associated with information on pointers obtained by over-approximating all pointers possibly pointing to the one object, the second pointer information is associated with information on pointers pointing to the one object, and the third pointer information is associated with pointers not pointing to the one object.

8. The method for automatically repairing memory deallocation errors according to claim 7, wherein
  the patch information comprises first patch information and second patch information, the first patch information associated with information on deallocation statements guaranteed to be capable of deallocating the objects without errors, and the second patch information associated with information on deallocation statements not guaranteed to be capable of deallocating the objects without errors.

9. The method for automatically repairing memory deallocation errors according to claim 8, wherein the generating of the status information comprises, for each point of the source code:
  updating the second patch information with the first patch information and information regarding first deallocation statements (U) if the objects are usable at said each point, the first deallocation statements (U) including deallocation statements for pointer information obtained by excluding the second pointer information from the first pointer information, and
  updating the second patch information with the information regarding first deallocation statements (U) and information regarding third deallocation statements (D) if the objects are not usable at said each point, the information regarding third deallocation statements (D) including information regarding deallocation statements included concurrently in both information regarding second deallocation statements (G) and the second patch information, the second deallocation statements (G) including deallocation statements for the second pointer information.

10. The method for automatically repairing memory deallocation errors according to claim 9, wherein the generating of the status information comprises, for each point of the source code:
  updating the first patch information by excluding deallocation statements included in the first patch information from the first patch information, adding the information regarding second deallocation statements (G), and excluding deallocation statements included in the updated second patch information, if the objects are usable at said each point, and
  updating the first patch information by adding the information regarding second deallocation statements (G) to the first patch information and excluding the deallocation statements included in the updated second patch information, if the objects are not usable at said each point.

* * * * *